Jan. 24, 1956  S. J. LAWRENCE  2,732,092
CLOSURE DEVICE
Filed Aug. 18, 1954
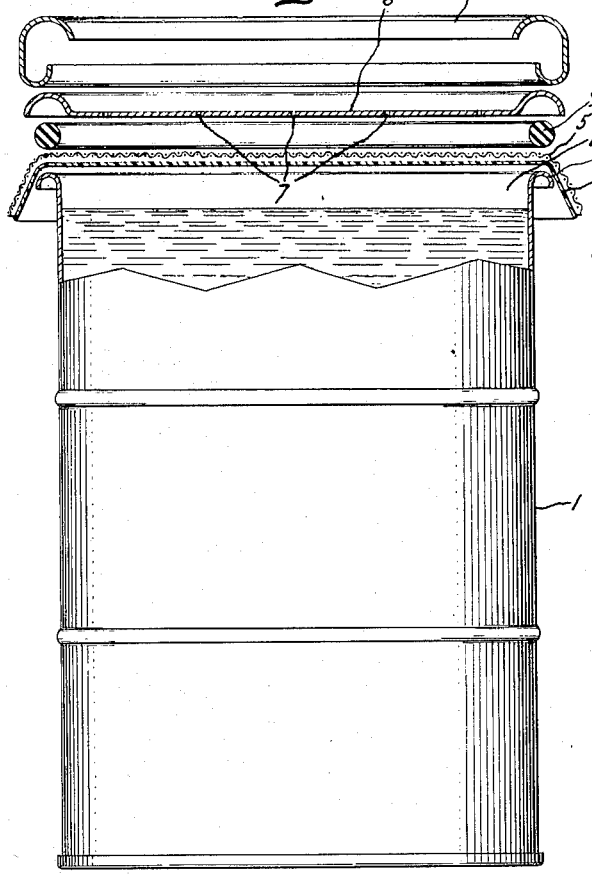
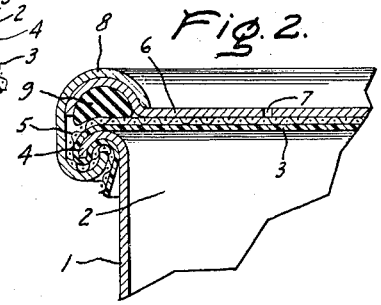
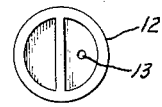
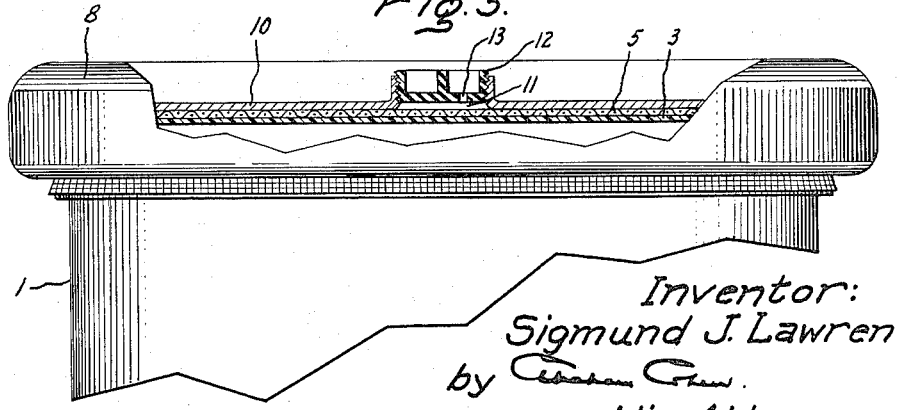
Inventor:
Sigmund J. Lawrence,
by
His Attorney.

United States Patent Office 2,732,092
Patented Jan. 24, 1956

2,732,092
CLOSURE DEVICE

Sigmund J. Lawrence, Schenectady, N. Y., assignor to General Electric Company, a corporation of New York Application August 18, 1954, Serial No. 450,610

6 Claims. (Cl. 220—44)

This invention is concerned with novel closure devices and, more particularly, relates to a closure device for containers having liquids confined therein which evolve gaseous hydrogen, said device comprising (1) a polymeric membrane impervious to the passage of and inert to the confined liquid but permeable to hydrogen, (2) a perforated lid for said closure device, and (3) a porous interliner positioned between the membrane and the outer lid capable of affording ready passage of the hydrogen gas therethrough from any portion of the membrane to the vent opening in the lid.

In the storage or in the transportation of certain liquids, a problem to be contended with involves adequately venting gases, particularly hydrogen gases, which may be released from the liquid within the container either because of its contact with elements in its environment or else because of slow chemical reactions which the liquid may be undergoing. Thus, in the transportation of high concentration sulfuric acid, such as 98 per cent $H_2SO_4$, it has been found that such acid in direct contact with steel drums or other similar metallic container tends to give off hydrogen at a sufficient rate preventing complete sealing of the container. A similar situation is encountered in connection with the confinement of aqueous solutions of hydrogen peroxide which again has been found to undesirably gasify due to evolution of hydrogen.

In recent years this problem of hydrogen evolution has been encountered in connection with certain organopolysiloxane compositions, particularly water emulsions of organopolysiloxanes containing organohydrogen siloxy groups, for instance, groups of the formula $CH_3HSiO$ (which may be the sole constituent of the organopolysiloxane ingredient in the emulsion, or else they may be intercondensed with other organosiloxy units, for instance, dimethylsiloxy units, monomethylsiloxy units, trimethylsiloxy units, phenylsiloxy units, etc., and mixtures of these organosiloxy units). Emulsions or dispersions containing these organic hydrogen siloxy units have been found to be eminently suitable for rendering various materials, particularly textiles, water-repellent, and compositions of this type are more particularly disclosed in such patents as 2,612,482—Rasmussen; 2,588,365–367—Dennett; and 2,588,393—Kauppi.

Generally, it is desirable that aqueous emulsions or dispersions (for brevity, the term "emulsions" is intended to include both the latter and dispersions) of such materials be manufactured at a central point for distribution to various consumers because of the necessity of having specialized equipment and personnel for making such emulsions. Because of this desirability for distribution of such products, hazardous handling problems have arisen in the transportation and even in the storage of such emulsions or dispersions due to the ready evolution of hydrogen from such materials. Unless the container is adequately vented to allow escape of the hydrogen, high pressures are built up with resultant explosions, causing damage to the container and surrounding equipment, as well as fires set off by contact of the pressurized hydrogen with the atmosphere.

Many attempts have been made to devise suitable closures for containers confining such hydrogen-evolving liquids, and up to the present time so far as is known none of these devices has been satisfactory. I have now discovered that I can confine these hydrogen-releasing liquids in containers, and the hydrogen evolved from these liquids can be adequately vented without undesirable build-up of pressure in the container, and that all the aforementioned difficulties can be readily obviated by employing as a closure device for such containers a polymeric membrane which must be inert to the liquid which is being confined within the container, and which also must be impervious to the passage of said liquid while still being permeable to the passage of the hydrogen, an outer perforated lid for the closure device, and a porous interliner which is placed between the polymeric membrane and the perforated lid, which is permeable to both the confined liquid and the hydrogen. This porous interliner is in direct contact with both the polymeric membrane and the outer perforated lid so that no matter at what point the hydrogen gas may diffuse through the polymeric membrane, it will find ready exit through the perforations of the interliner and then through the opening or openings in the outer lid. This composite closure assembly may be held in position by suitable clamps which will hold the entire closure device in rigid attachment to the container.

The accompanying drawing shows two embodiments of the claimed invention. Fig. 1 shows an assembly used to seal a drum 1 (containing a hydrogen-releasing fluid), in which over the opening 2 of the container there is positioned a polymeric membrane 3 which advantageously extends past the lip 4 of the drum. A porous interliner 5 is positioned across the top of the membrane, and superposed on the interliner is a perforated lid 6 containing vents 7, the entire assembly being positioned over the opening of the container by suitable means, such as, for instance, by a clamp 8, which preferably exerts pressure on the edges of the closure device permitting a certain amount of flexibility in the central portion of the entire closure device. A gasket 9 is positioned in the place indicated to maintain a tight fit.

Fig. 2 is a close-up view of a corner of Fig. 1 in which all elements of the device are in fixed position.

Fig. 3 shows another embodiment of the claimed invention whereby the opening of the container 1 has positioned across it a polymeric membrane 3. A porous interliner 5 is placed across the top of the membrane in close proximity with the latter. A solid, perforation-free lid 10 is superposed upon the interliner, this lid having a single large bung opening 11 in which is inserted, for instance, by screwing in place, a threaded bung 12 (non-threaded bungs may also be used) containing one or more small openings 13 for release of the hydrogen. As was the case in Fig. 1, a clamp, such as a Leverlok clamp 8, is employed to maintain the entire assembly in place. The embodiment in this figure illustrates clearly the advantage of the porous interliner which permits ready passage of the hydrogen through the polymeric membrane and then out through a single opening suitably positioned in the outer lid, thus obviating the necessity for using more than one opening or vent in the outer lid.

Fig. 4 is a plan view of the bung 12 showing the single opening 13.

It will, of course, be apparent that in addition to the embodiments defined by Figs. 1 to 4, other embodiments coming within the scope of the invention will be apparent to those skilled in the art and are intended to be included within the scope of the invention.

Among the polymeric materials which may be employed as the membrane may be mentioned various natural and synthetic rubbers (in the vulcanized state), polyethylene, electron-irradiated polyethylene, ethyl cellulose, butyl rubber, neoprene, etc. Membranes made from natural rubber latex or from solid polyethylene are especially suitable in the practice of the present invention. Although there is less tendency for hydrogen build-up and more rapid diffusion of the hydrogen through a natural rubber membrane (or diaphragm) than is found with a polyethylene membrane of the same thickness, because of the presently lower cost of polyethylene, the latter is preferred in the practice of the present invention although the use of other suitable polymeric materials is not precluded.

The thickness of the membrane may be varied depending upon such factors as the polymeric material employed, the type of liquid confined in the container, the rate and amount of hydrogen it is desired to diffuse through the membrane, etc. I have found that when employing solid polyethylene (of about 12,000 to 30,000 molecular weight) as the flexible hydrogen-permeable polymeric diaphragm, thicknesses of the order of about 0.001 to 0.005 inch may be employed consistent with the considerations for choosing the type or size of diaphragm recited above.

The perforated lid employed in the closure device may be of any material, the size of whose perforations are not critical, and may range from about 5 mils to about 75 mils or more in diameter. The perforated lid may be made of any suitable material, e. g., metallic compositions, such as tin, iron, etc. It is essential that the perforated lid be unaffected by the hydrogen with which it will come in contact as the former diffuses through the lid. Again, the thickness of the lid is not critical and is advantageously within the range of from about 10 to 50 mils thick. When the lid is of the structure defined in Fig. 3 above, the perforated bung inserted in the bung opening through which the hydrogen will pass may be of any suitable material such as polyethylene, a metal, polystyrene, etc.; as long as it is unaffected by hydrogen.

It is preferred that the porous interliner be flexible in nature and be sufficiently porous to readily pass the hydrogen therethrough but yet, in some respects, be sufficiently strong to act as a reinforcing backing for the polymeric membrane. The porosity of the interliner is not critical as evidenced by the fact that one may employ for the purpose materials such as cheesecloth, screens of various sieve sizes, such as metallic screens, polymeric screens (e. g., polyvinylidene chloride, nylon, etc.), etc. The function of the porous interliner is to prevent sealing between the underside of the lid and the upper side of the membrane and thus reduce the effective diffusion area of the membrane. In general, the number of openings in the perforated lid is kept to a minimum and advantage is taken of the porosity of the interliner for the diffusing hydrogen gas to find its way through the openings of the interliner and out through the venting hole or holes in the outer lid.

In order that those skilled in the art may better understand how the present invention may be practiced, the following example is given by way of illustration and not by way of limitation. All parts are by weight.

*Example*

A hydrogen-releasing emulsion was prepared similarly as described in the aforementioned Dennett Patent 2,588,366 composed of 50 parts of a mixture of a methyl hydrogen polysiloxane fluid and a methylpolysiloxane fluid free of silicon-bonded hydrogen, 1 part oleic acid, 2.5 parts of an anionic emulsifying agent and about 46.5 parts of water. This emulsion was placed in a metallic drum and a closure device positioned over the opening of the drum comprising an outer perforated metallic lid, a polyethylene diaphragm, about 0.0015 inch thick, positioned directly over the opening of the drum, and a single layer (2 or more layers may be used) of cheesecloth employed as an interliner, and a clamp used to hold this assembly in place over the opening of the drum in the manner described in the accompanying drawing of Fig. 1. It was found that little, if any, pressure built up in the drum even after standing for many days at about 35° C. Moreover, the hydrogen, which diffused through the polyethylene diaphragm moving laterally through the cheesecloth and out through the vent holes in the lid, did so in an even and in hardly detectable amounts, illustrating clearly the uniformity of diffusion obtainable by means of the above-described closure device. The drum could be rolled on its side and no detectable amount of the emulsion escaped. Samples of drums containing similar silicone emulsions and fitted with my above-described closure device have been stored or shipped long distances by various modes of travel without any difficulty or without any apparent harmful effects or losses.

It will, of course, be apparent to those skilled in the art that in place of the polyethylene diaphragm and interliner disclosed above, one may use other materials, examples of which have been given previously, without departing from the scope of the invention. Various thicknesses of diaphragm, interliner and perforated lid obviously also may be employed within the scope of the invention, care being taken that the outer lid is sufficiently strong to protect the opening and the polymeric membrane from damage due to handling of the container. Similarly, other liquids tending to release hydrogen may also be employed in place of that described in the above example. The embodiment of the invention herein defined can be varied widely as is clearly apparent from the accompanying drawings.

What I claim as new and desire to secure by Letters Patent of the United States is:

1. A closure device for containers having liquids confined therein which evolve gaseous hydrogen, said device comprising (1) a polymeric membrane inert and impervious to the passage of the confined liquid but permeable to hydrogen, (2) a perforated lid for said closure device, and (3) a porous interliner positioned between the membrane and the outer lid capable of affording free passage of the hydrogen gas therethrough from any portion of the membrane through the opening in the lid.

2. A closure device for containers having liquids confined therein which evolve gaseous hydrogen, said device comprising (1) a polymeric membrane inert and impervious to the passage of the confined liquid but permeable to hydrogen, said membrane being selected from the class consisting of polyethylene and natural rubber membranes, (2) a perforated lid for said closure device, and (3) a porous interliner positioned between the membrane and the outer lid capable of affording free passage of the hydrogen gas therethrough from any portion of the membrane through the opening in the lid.

3. A closure device for containers having liquids confined therein which evolve gaseous hydrogen, said device comprising (1) a polymeric membrane comprising polyethylene, (2) a perforated lid for said closure device, and (3) a porous interliner positioned between the membrane and the outer lid capable of affording free passage of the hydrogen gas therethrough from any portion of the membrane through the opening in the lid.

4. A closure device for containers having organohydrogenopolysiloxane liquids confined therein which evolve gaseous hydrogen, said device comprising (1) a thin polyethylene membrane, (2) a perforated lid for said closure device, and (3) a cheesecloth interliner positioned between the polyethylene membrane and the perforated lid.

5. A container for liquids comprising a container portion and an opening portion fitted with a closure device comprising (1) a polymeric membrane inert to and impervious to the passage of hydrogen-evolving liquids, (2) a perforated lid for said closure device and (3) a porous interliner positioned between the membrane and the outer lid capable of affording free passage of hydrogen gas therethrough from any portion of the membrane through the opening in the lid.

6. A container as in claim 5 in which the polymeric membrane used in the closure device for said container comprises solid polyethylene.

References Cited in the file of this patent

UNITED STATES PATENTS

| 2,568,637 | Jardim | Sept. 18, 1951 |
| 2,572,669 | Sarge et al. | Oct. 23, 1951 |
| 2,685,546 | Gibb, Jr. | Aug. 3, 1954 |